Patented Aug. 20, 1940

2,212,084

UNITED STATES PATENT OFFICE 2,212,084

NUCLEAR ALKYLATED DIAMINOSTILBENE DISULPHONIC ACIDS AND PROCESS OF MAKING SAME

Fritz Straub, Basel, and Hermann Schneider, Riehen, Switzerland, assignors to the firm of Society of Chemical Industry in Basle, Basel, Switzerland No Drawing. Application May 16, 1938, Serial No. 208,322. In Switzerland May 20, 1937

10 Claims. (Cl. 260—510)

It has been found that 6,6'-diaminostilbene-2,2'-disulphonic acids substituted in the benzene nuclei by alkyl groups of the general formula

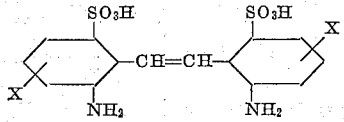

wherein the two X's stand for alkyl groups, can be produced by treating 6-nitro-1-methylbenzene-2-sulphonic acids containing an alkyl group as further substituent with oxidizing agents which bring about a union of 2 molecules by oxidation of the two methyl groups standing in 1-position, and then treating the 6,6'-dinitrostilbene-2,2'-disulphonic acids thus obtained with reducing agents which cause a reduction of the nitro-groups to amino-groups.

6-nitro-1-methylbenzene-2-sulphonic acids substituted by an alkyl-group coming into consideration for the present process may contain an alkyl group as substituent in 3-, 4- or 5-position. It is advantageous to use 4-alkyl-6-nitro-1-methylbenzene-2-sulphonic acids. The alkyl radical standing in 4-position may have a straight or branched chain. There come into consideration alkyl ralicals having few or many carbon atoms, preferably however such radicals which have an alkyl group containing at least three carbon atoms, for example the isopropyl group.

For carrying out the oxidation there may be used various oxidizing agents which bring about a union of 2 molecules by oxidation of the two methyl groups standing in 1-position, for example salts of permanganic acid and chromic acid. Particularly favorable results are obtained with an alkaline solution of sodium hypochlorite.

The 6,6'-dinitrostilbene-2'-disulphonic acids alkylated in the benzene nuclei which are formed by the oxidation are valuable intermediate products for the manufacture of dyestuffs. By the action of various reducing agents which cause a reduction of the nitro-groups to amino-groups, for example iron and acetic acid or hydrochloric acid, they may be converted in similar manner like other aromatic nitro compounds into the corresponding nuclear alkylated 6,6'-diamino-stilbene-2,2'-disulphonic acids which are also valuable intermediate products, for example for the manufacture of dyestuffs.

The following example illustrates the invention:

72 parts by weight of the magnesium salt of 6-nitro-4-isopropyl-1-methylbenzene-2-sulphonic acid are dissolved in 100 parts of hot water, and the solution is cooled to 60° C. The solution is added while stirring well at 50° C. to a solution of 200 parts of caustic soda lye of 30 per cent strength and 20 parts of sodium hypochlorite (aqueous solution of 14.2 per cent strength). At 65–70° C. there is run in within about an hour a further 90 parts of sodium hypochlorite (aqueous solution of 14.2 per cent strength) in such a manner that there always remains a feeble reaction for active chlorine. After stirring for a further half hour, the whole is cooled to the temperature of the room and there is gradually added while cooling so much hydrochloric acid of 30 per cent strength that an alkaline reaction of the mixture on phenol-phthalein paper is no longer detected; the orange-yellow magma of the sodium salt of 6,6'-dinitro-4,4'-di-isopropylstilbene-2,2'-disulphonic acid which is produced is filtered by suction. The still moist paste of this sodium salt is now stirred with 200 parts of water to form a thin magma which is then made feebly acid to Congo by the addition of a little mineral acid. This magma in the course of ¼ hour while stirring is allowed to flow into a boiling mixture of 200 parts of iron turnings, 20 parts of acetic acid of 85 per cent strength and 500 parts of water, and the whole is boiled while stirring for about ½ hour. Cooling to 50° C. follows, and the reaction is brought to feeble alkalinity by addition of calcined sodium carbonate; the precipitated iron mud is filtered and washed. The filtrate together with the washing water, in all about 1000–1500 parts, is made powerfully acid to Congo by addition of concentrated hydrochloric acid, whereby the sparingly soluble 6,6'-diamino-4,4'-di-isopropylstilbene-2,2'-disulphonic acid of the formula

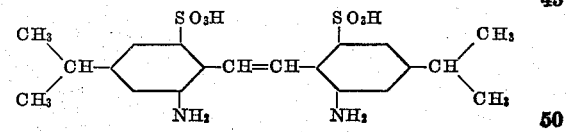

is precipitated in the form of a thick pale yellow crystalline precipitate. The whole is allowed to cool, filtered and dried.

What we claim is:

1. In the manufacture of 6,6'-diaminostilbene-2,2'-disulphonic acids substituted in the benzene nuclei by alkyl groups, the step which comprises reacting 6-nitro-1-methylbenzene-2-sulphonic acids which contain as a further nuclear substituent a lower alkyl group with oxidizing agents useful in producing stilbene compounds by oxidation.

2. In the manufacture of 6,6'-diaminostilbene-2,2'-disulphonic acids substituted in the benzene nuclei by alkyl groups, the step which comprises reacting 6-nitro-1-methylbenzene-2-sulphonic acids which contain as a further nuclear substituent in 4-position a lower alkyl group with oxidizing agents useful in producing stilbene compounds by oxidation.

3. In the manufacture of 6,6'-diaminostilbene-2,2'-disulphonic acids substituted in the benzene nuclei by alkyl groups, the step which comprises reacting 6-nitro-1-methylbenzene-2-sulphonic acids which contain as a further nuclear substituent in 4-position a lower alkyl group having at least 3 carbon atoms with oxidizing agents useful in producing stilbene compounds by oxidation.

4. In the manufacture of 6,6'-diaminostilbene-2,2'-disulphonic acids substituted in the benzene nuclei by alkyl groups, the step which comprises reacting 6-nitro-1-methylbenzene-2-sulphonic acids which contain as a further nuclear substituent in 4-position a lower alkyl group having at least 3 carbon atoms arranged in a branched chain with oxidizing agents useful in producing stilbene compounds by oxidation.

5. In the manufacture of 6,6'-diaminostilbene-4,4'-diisopropyl 2,2'-disulphonic acids, the step which comprises reacting 6-nitro-4-isopropyl-1-methylbenzene-2-sulphonic acid with oxidizing agents useful in producing stilbene compounds by oxidation.

6. Nuclear alkylated stilbene disulphonic acids of the general formula

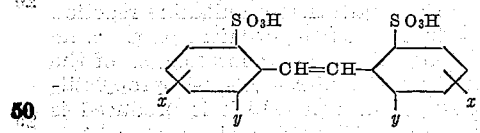

wherein the two $x$'s stand for lower alkyl groups and the two $y$'s stand for substituents selected from the group consisting of $NH_2$ and $NO_2$.

7. Nuclear alkylated stilbene disulphonic acids of the general formula

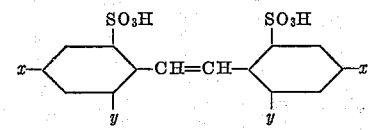

wherein the two $x$'s stand for lower alkyl groups and the two $y$'s stand for substituents selected from the group consisting of $NH_2$ and $NO_2$.

8. Nuclear alkylated stilbene disulphonic acids of the general formula

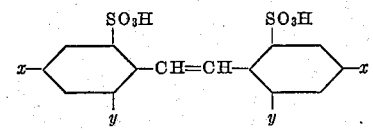

wherein the two $x$'s stand for lower alkyl groups having at least 3 carbon atoms and the two $y$'s stand for substituents selected from the group consisting of $NH_2$ and $NO_2$.

9. Nuclear alkylated stilbene disulphonic acids of the general formula

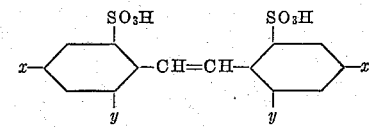

wherein the two $x$'s stand for lower alkyl groups having at least 3 carbon atoms arranged in a branched chain and the two $y$'s stand for substituents selected from the group consisting of $NH_2$ and $NO_2$.

10. The 4,4'-diisopropylstilbene-2,2'-disulphonic acids of the formula

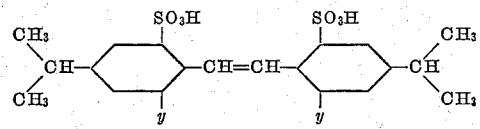

wherein the two $y$'s stand for substituents selected from the group consisting of $NH_2$ and $NO_2$.

FRITZ STRAUB.
HERMANN SCHNEIDER.

CERTIFICATE OF CORRECTION.

Patent No. 2,212,084.

August 20, 1940.

FRITZ STRAUB, ET AL.

It is hereby certified that error appears in the above numbered patent requiring correction as follows: In the heading to the printed specification, line 10 thereof, for the foreign filing date "May 20, 1937" read --May 19, 1937--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.